B. A. SCHRODER.
WATER HEATER.
APPLICATION FILED DEC. 28, 1908.
1,008,077.
Patented Nov. 7, 1911.
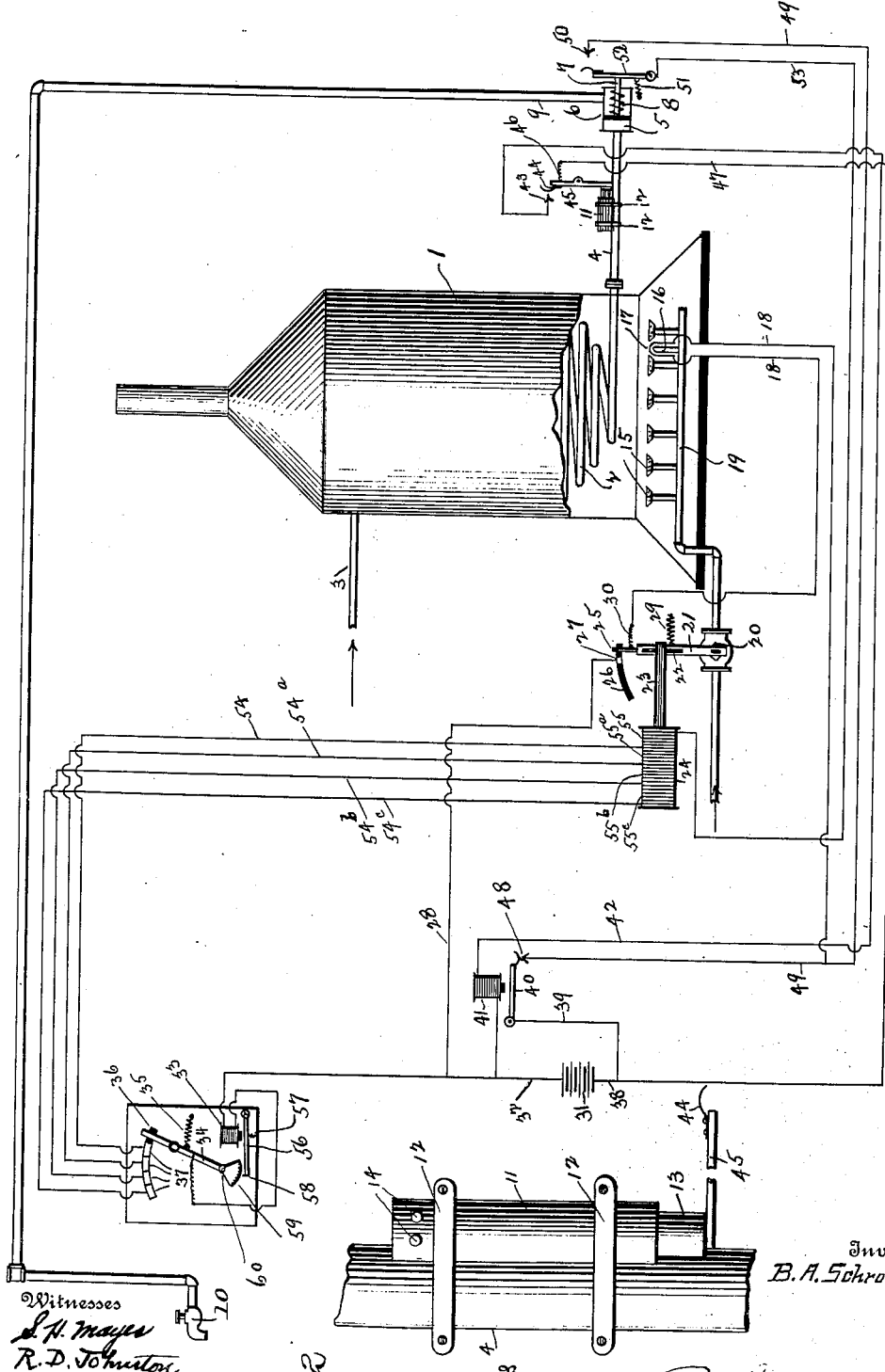

UNITED STATES PATENT OFFICE.

BERNARD A. SCHRODER, OF BIRMINGHAM, ALABAMA.

WATER-HEATER.

1,008,077.  Specification of Letters Patent.  Patented Nov. 7, 1911.

Application filed December 28, 1908. Serial No. 469,704.

*To all whom it may concern:*

Be it known that I, BERNARD A. SCHRODER, a citizen of the United States, residing at Birmingham, in the county of Jefferson and State of Alabama, have invented new and useful Improvements in Water-Heaters, of which the following is a specification.

My invention relates to an improvement in water heaters designed particularly with a view to furnishing an apparatus which is adapted for use with either a single or double piping system and capable of delivering either hot or cold water, as may be desired. Heaters thus connected with the piping system are usually distant from the points of use for the heated water.

The chief object of my invention is to make such heaters primarily subject to the control of the user by means operable from the various points of use, such primary control being supplemented by automatic safety secondary controls, one responsive to the water pressure upon opening a faucet which cuts on and ignites the gas, and another responsive to abnormal conditions in the heater which cuts off the gas. These automatic controls, being secondary, will not come into service until the primary control is operated, hence the heater is without effect on the piping system until the user cuts it into service, prior to which, obviously, cold water may be drawn through the heater.

As a preferred means for controlling the heater, I employ electric apparatus comprising a solenoid for operating the gas valve in a circuit controlled by switches at the distant points of use as well as by the secondary automatic controls.

A further object is to regulate the heat of the water by the hand switches instead of by the secondary controls which are, strictly speaking, safety devices rather than controls. These safety devices, in addition to cutting off the gas, perform the novel function of effecting the restoration of the hand switches to their initial position, thereby giving notice to the user of abnormal conditions at the heater and requiring him to again operate the hand switch before the heater can come again into use. In this connection, the water pressure secondary control, acts instantly, upon the closing of the faucet, to cut the heater out of service and return the hand switch to initial position.

A further object of my invention is to utilize an electric igniter for the purpose of igniting the gas, thereby avoiding the necessity of continuously burning a pilot flame, as well as the danger of escape and explosion of the gas, should the pilot become accidentally extinguished.

My invention further comprises many novel features and details hereinafter more fully described and claimed, reference being had to the accompanying drawings, in which:—

Figure 1 is a side elevation of my improved water heater partly broken away and having electric circuits illustrated diagrammatically. Fig. 2 is a detail view of the thermostat for automatically breaking the main circuit.

Similar reference numerals refer to similar parts throughout the drawings.

As illustrated, I provide a water heater having a casing 1 surrounding a heating coil or pipe 2 to which water is supplied by a pipe 3 and drawn off through a pipe 4, the latter pipe leading to a cylinder 5. This cylinder contains a piston valve 6 which has connected thereto a stem 7 and which, when the water pressure on both sides of it is balanced, is moved to the position shown by the coil spring 8. From this cylinder a pipe 9 leads to the faucet 10, which will, generally speaking, be at some distant point of use in the house.

Mounted on the pipe 4 is a shell or casing 11 rigidly held in place by straps 12 and inclosing a thermostat 13 of any standard composition, which thermostat is rigidly connected at one end by means of bolts 14 to the casing and left with its other end, which projects without the casing, free to expand or contract and in so doing to operate a circuit closing switch, hereinafter described.

Below the coil in the heater I provide a number of gas burners 15 and a small pilot burner 16, above which is suspended a section of platinum wire 17 in circuit with the wire 18. Gas is supplied to these burners through a pipe 19 under the control of a valve 20 connected to and operated by a lever 21. The lever 21 is provided with a longitudinal slot 22 with which the core 23 of the solenoid 24 makes sliding connection. This lever 21, at its upper end, carries the contact point 25 which moves over a non-conducting plate 26 and by engaging the contact plate 27 closes the circuit to the wires 18 from the wire 28. A spring 29 is connected to the lever 21 and tends to draw the same away from the solenoid and close the gas valve whenever the solenoid is deënergized. The wire 18 is connected to the contact point 25 by a wire coil 30 which provides for the requisite play of the lever in controlling the gas.

Electrical energy for controlling the system is derived from a battery 31, or a similar source of supply. Current flows from this source through a line wire 32, with which the wire 28 connects. The wire 32 connects with the windings of a magnet 33 and continues to the hand switch arm 34. This arm is acted upon by a spring 35 which normally holds it over a non-conducting segment 36, thereby breaking the main circuit until the arm is moved by the user into engagement with one of the contact plates 37. Wires 38 and 39 lead from the battery to the armature 40 of a magnet 41, which is energized by a wire 42 leading from the wire 32 and continuing beyond the magnet to the contact point 43, which is adapted to be engaged by a contact 44 carried on the upper end of a pivoted arm 45, the lower end of which is adapted to be moved by the thermostat, as it expands, against the action of a spring 46, to close the circuit at 43, and through the spring 46 and wire 47 back to the battery. When normal conditions obtain, the circuit will be broken at the contacts 43 and 44, and the magnet 41 will be deënergized, permitting the armature 40 to swing down by gravity and close the circuit to the point 48 and through wire 49 to a contact 50, where the circuit is normally broken when the water is not running, as the spring 51 will hold the pivoted contact arm 52 away from the point 50 until the stem 7 of the plunger 6 is moved to the right to permit water to flow into pipe 9 and through the faucet. By opening the faucet and reducing the pressure behind the plunger, the same will act to close the circuit at the point 50 and through wire 53 to the solenoid 24. The current, however, will not flow through the solenoid until the switch arm 34 is moved into contact with the first plate 37, in which event the circuit will be closed from the battery through arm 34 and wire 54 and caused to flow through the portion 55 of the winding on the solenoid, and thence by wire 53 across the contact 50 and by wires 49 and 39 back to the battery. Thus the partial energizing of the solenoid will cause the core 23 to move inwardly and open the gas valve partially and in so doing will move the contact 25 causing a momentary closing of the igniter circuit through wire 28, plate 27, point 25, and through wires 18 across the platinum igniter coil back to wire 49 and the battery. As the contact 25 moves across the plate 27 the current will cause the platinum wire to become momentarily incandescent and will immediately light the pilot flame and the burners 15, after which the igniter circuit is broken. If the arm 34 be moved into contact with the second plate 37, a second section $55^a$ of the winding of the solenoid 24 will be energized by current flowing through the wire $54^a$ and the core will be drawn farther to the left and the gas valve opened wider, and the core being drawn farther and farther to the left as the current is caused to flow along wires $54^b$ and $54^c$, in each case the number of windings energized and the effective extent of the solenoid being increased. The magnet 33 has an armature 56 normally held downwardly by a spring 57 and which, at its outer end, carries a dog or tooth 58 adapted to engage with a segmental rack 59 forming the lower end of the switch arm 34 below its pivot point 60. It will be evident that when the circuit is closed at the point 50 and through the switch 34, the magnet 33 will be energized and will draw its armature 56 upwardly so that the tooth 58 will engage the segment 59 and hold the arm against the action of the spring 35 in the position to which it is set. The engagement of the dog will not prevent the arm being moved by hand to different positions, but will hold the arm against the spring.

In operation, if cold water is desired, the arm 34 is left in the position shown and cold water can be drawn by opening the faucet 10, since the closing of the contact at 50 will leave the main circuit still broken at the hand switch 34 and cold water can accordingly be drawn as if there were no heater. Should it be desired, however, to raise the temperature of the water, the arm 34 is moved on to the first contact plate 37 and the circuit being closed through the magnet 33, the arm will be locked in its position, and the solenoid 24 partially energized with the result that the gas will be turned on partly and the igniter circuit closed to ignite the gas. The magnet 41 will be deënergized at this time as the circuit stands broken at the point 43. If now the arm 34 be swung over to the farthest contact 37, the core 23 will assume its extreme position to the left and a full flow of gas will result, it being noted that after the point 25 has moved over the contact 27, the igniter circuit is broken. Should water become too highly heated under these conditions, the thermostat 13 will expand outwardly and close the contact at the point 43, thereby energizing the magnet 41 and breaking the main circuit at the point 48. This will result immediately in deënergizing the solenoid 24 so that gas will be cut off by the action of the spring 29 and at the same time the magnet 33 will be deënergized and the spring 35 will return the arm 34 to its initial position. The apparatus will thus automatically break the contact at 43 and close the contact at 40, and will leave the circuit broken by the hand switch 44 so that it is necessary for the user to move this switch again before bringing the heater into service.

As above described, my apparatus is extremely simple in construction and entirely safeguards against the dangers of an apparatus wholly dependent upon automatic action either of a thermostat or water pressure regulated valves.

The gist of my invention lies in the primary hand control from the points of use whether near or distant which coöperates with one or both secondary or safety controls automatically responsive to the flow, pressure or temperature, as the case may be, of the water in the heater.

Having thus described my invention, what I claim as new and desire to secure by Letters Patent, is:—

1. In a water heating apparatus, a water heating receptacle connected with a water pipe, a heater for heating said receptacle, manually controlled means to regulate said heater, automatic means, responsive to the drop in pressure in said pipe, due to the drawing of water therethrough, which coöperates with said manually controlled means to cut said heater into service and means making said manual an automatic means inter-dependent in the performance of their respective functions.

2. In a water heating apparatus, a heating receptacle forming part of a water supply pipe, a heater for heating said receptacle, an automatic means responsive to the flow of water through said pipe, and manually controlled means operable from a point of use of the heated water and means controlled jointly by said automatic and manually controlled means to cut said heater into service and to regulate the intensity of the heat, substantially as described.

3. In a water heater, a water coil connected to a house supply pipe, a heater for said coil, a device at said heater for controlling the operation of the heater, a mechanism responsive to the flow of water through said house pipe and mechanism positioned at a point of use of the heated water and adapted to be manually adjusted, means jointly controlled by said mechanisms to actuate said controlling device for the heater, automatic safety means responsive to abnormal conditions in the heater which interrupts the operating connection between said mechanisms and device, and means to automatically restore said manually adjusted mechanism to initial position when such interruption of the operating connections occurs, substantially as described.

4. In a water heater connected with a house service water main, a water receptacle, a gas burner, a gas valve, automatic mechanism responsive to the drawing of water through said heater which tends to open said valve, manually controlled means operating independently of the drawing of the water to arrest the opening movement of the valve at predetermined points and thereby to control the extent to which said valve is thus automatically opened and mechanism operable for a distant point of use to adjust said latter means to one of a series of predetermined operating positions.

5. In a water heater disposed at a distance from points of use of the water heated, a water receptacle in circuit with a pipe leading to faucets at distant points of use, a heating means for heating said receptacle, and interdependent manual and automatic means for controlling said heating means, said manual means being adjacent to but independent of said faucets and operable from said distant points of use, and said automatic means being responsive to the drawing of water through said heater.

6. In a water heater disposed at a distance from points of use for the water heated, a water receptacle in circuit with a pipe leading to the distant points of use, a heating means for heating said receptacle, and interdependent manual and automatic means for controlling said heating means, said manual means being operable from said distant points of use, and said automatic means being responsive to the drawing of water through said heater to cut said heating means into and out of service.

7. In a water heater, a water receptacle connected in a water pipe, a gas burner for heating said receptacle, valve means controlling the flow of gas to said burner, electro-magnetic means for operating said valve means, a manually controlled switch and circuit connections to control the intensity of the electro-magnetic means and thereby to regulate the movement of the valve, and a switch, automatically controlled by the drop in pressure due to the drawing of water through said pipe, which makes or breaks the main circuit to said electro-magnetic means, substantially as described.

8. In a water heater, a water coil connected to a water pipe, a gas burner for heating said coil, valve means controlling the flow of gas to said burner, electro-magnetic means for operating said valve means, a manually controlled switch and circuit connections to control the intensity of the electro-magnetic means and thereby to regulate the movement of the valve, a switch automatically controlled by the drop in pressure due to the drawing of water through said pipe which makes or breaks the main circuit to said electro-magnetic means, in combination with an electric igniter for the gas, and a make and break switch for the igniter circuit which is operated by the electro-magnetic controlling means for the gas valve means.

9. In a water heater, a water heating coil in a pipe line, a gas burner for heating said coil, a valve controlling the flow of gas to the burner, a solenoid for operating said valve, a series of circuit wires tapped on the windings of said solenoid at different points, a hand operated multi-point switch for controlling the flow of current through one or the other of said circuits, a source of electric energy for delivering current to said circuits, a water pressure controlled switch for making or breaking the solenoid circuit automatically, a thermostat, a switch controlled by said thermostat to break said main circuit, an electrical igniter for the gas in a separate circuit, and a make and break switch operated by said solenoid for energizing the igniter circuit as the gas valve opens.

10. In a water heater, the combination with a water coil, a gas burner and an electric igniting means for said burner, of a gas controlling valve, a solenoid for actuating said valve, a source of electric energy, circuits leading therefrom to said solenoid and igniting means, a multi-point manually operated switch for controlling the flow of current to said solenoid, spring means to return said switch arm to initial position, electro-magnetically controlled means to hold said switch in the adjusted position against the action of said spring, an automatic make and break switch controlling the main circuits, which automatic means respond to the drawing of water through the heater to close the main circuit and lock the hand switch when the latter is moved from its initial position, and means to close the igniter circuit as the gas valve opens.

11. In a water heater, the combination with a water coil, a gas burner, of a gas controlling valve, a solenoid for actuating said valve, a source of electric energy, circuits leading therefrom to said solenoid, a multipoint manually operated switch for controlling the flow of current to said solenoid, spring means to return said switch arm to initial position, electro-magnetically controlled means to hold said switch in the adjusted position against the action of said spring when the main circuit is closed, an automatic make and break switch controlling the main circuit which automatic means respond to the drawing of water through the heater to close the main circuit and lock the hand switch when the latter is moved from its initial position, and means to ignite the gas when turned on.

12. In a water heater, the combination with a water coil, a gas burner and an electric igniting means for said burner, of a gas controlling valve, a solenoid for actuating said valve, a source of electric energy, circuits leading therefrom to said solenoid and igniting means, a multi-point manually operated switch for controlling the flow of current to said solenoid to all the circuits, spring means to return said switch arm to initial position, electro-magnetically controlled means which, when energized, holds said switch in any adjusted position against the action of said spring, an automatic make and break switch controlling the main circuits, which automatic means respond to the drawing of water through the heater to close the main circuit and energize the means to lock the hand switch when the latter is moved from its initial position, and a switch to make and break the igniter circuit which is moved by the solenoid which actuates the gas valve, substantially as described.

13. In a water heater, a water receptacle, water inlet and outlet pipes connected therewith, one or more faucets for discharging water from said outlet pipe, a heater for said receptacle, an adjustable device adjacent to each faucet, an automatic device responsive to the drawing of water through said receptacle, means controlled jointly by any one of said adjustable devices when operating in conjunction with said automatic device, and mechanism controlled by said latter means to cut said heater into service and regulate the intensity of its heat, substantially as described.

14. In a water heater, a water coil connected with a house service pipe, a gas heater for the coil comprising means to ignite the gas and valve means to control and cut off the gas, means tending to return said valve when opened to a closed position, and the following coöperating mechanisms for controlling the opening of said valve, viz: a device which moves responsive to a drop in pressure in the water pipe due to the drawing of water through the heater, a device positioned at the point of use of the heated water, and power transmission means responsive only to the joint and simultaneous operation of both said mechanisms for actuating said valve to open same against the action of said means for automatically returning the gas valve to a closed position, substantially as described.

15. The combination in a single pipe water distribution system for delivering hot or cold water for house service, of a pipe line, a water heater arranged to heat the water flowing through said pipe line, interdependent means for controlling said heater comprising a mechanism responsive to the drawing of hot or cold water through said pipe line which sets the heater to go into service upon the operation of manually controlled mechanism and manually controlled mechanism for setting the heater to go into service which is disposed adjacent to but independent of the faucets connected with said pipe line and operable from a distant point or points of use, substantially as described.

16. The combination in a single pipe water distribution system for delivering hot or cold water for house service, of a pipe line, a water heater arranged to heat the water flowing through said pipe line, interdependent means for controlling said heater comprising a mechanism responsive to the drawing of hot or cold water through said pipe line which sets the heater to go into service upon the operation of manually controlled mechanism, and manually controlled mechanism for setting the heater to go into service which is disposed adjacent to but independent of the faucets connected with said pipe line and operable from a distant point or points of use, said manually controlled mechanism comprising means to regulate the heating action of said heater from the said distant point or points of use.

In testimony whereof I have hereunto set my hand in presence of two subscribing witnesses.

BERNARD A. SCHRODER.

Witnesses:
    ANNIE L. PEACE,
    R. D. JOHNSTON, Jr.